United States Patent
Kass et al.

(10) Patent No.: US 11,093,874 B2
(45) Date of Patent: Aug. 17, 2021

(54) RESOURCE VIRTUALIZATION

(71) Applicant: Accenture Global Solutions Limited, Dublin (IE)

(72) Inventors: Alex Kass, Palo Alto, CA (US); Manish Mehta, Milpitas, CA (US); Taurean Dyer, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 573 days.

(21) Appl. No.: 15/435,716

(22) Filed: Feb. 17, 2017

(65) Prior Publication Data
US 2017/0243153 A1    Aug. 24, 2017

Related U.S. Application Data

(60) Provisional application No. 62/297,473, filed on Feb. 19, 2016.

(51) Int. Cl.
| | |
|---|---|
| G06Q 10/06 | (2012.01) |
| G06F 40/174 | (2020.01) |
| G06F 40/186 | (2020.01) |
| H04L 12/911 | (2013.01) |
| H04L 29/08 | (2006.01) |

(52) U.S. Cl.
CPC ... *G06Q 10/063118* (2013.01); *G06F 40/174* (2020.01); *G06F 40/186* (2020.01); *G06Q 10/063112* (2013.01); *H04L 47/70* (2013.01); *H04L 67/10* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 5,832,483 | A | 11/1998 | Barker |
| 6,006,195 | A | 12/1999 | Marchak et al. |
| 6,480,863 | B1 | 11/2002 | Scheifler et al. |
| 6,988,140 | B2 | 1/2006 | Chintalapati et al. |
| 7,222,330 | B2 | 5/2007 | Bicknell et al. |
| 7,499,899 | B2 | 3/2009 | Siegel et al. |
| 7,584,302 | B1 | 9/2009 | Pg et al. |
| 7,593,946 | B2 | 9/2009 | Toomey |
| 2002/0029161 | A1* | 3/2002 | Brodersen .......... G06Q 10/1093 705/7.14 |

(Continued)

FOREIGN PATENT DOCUMENTS

CA    2946306 A1 * 12/2017    ......... H04L 67/1021

OTHER PUBLICATIONS

Duggan, Dominic. Enterprise Software Architecture and Design: Entities, Services, and Resources. Wiley—IEEE Press 2012 (Edition : 1, pp. 600). (Year: 2012).*

(Continued)

*Primary Examiner* — Patricia H Munson
*Assistant Examiner* — Nancy N Prasad
(74) *Attorney, Agent, or Firm* — Crowell & Moring

(57) ABSTRACT

The global proliferation of high speed communication networks has created unprecedented opportunities for geographically distributed resource interaction. However, while the opportunities exist and continue to grow, the realization of those opportunities has fallen behind. A resource virtualization system solves the enormous technical challenges of finding and evaluating resources to assign to complex projects.

15 Claims, 15 Drawing Sheets

(56) References Cited

U.S. PATENT DOCUMENTS

| | | | |
|---|---|---|---|
| 2002/0184071 A1* | 12/2002 | Bicknell | G06Q 10/0631 717/101 |
| 2007/0299795 A1 | 12/2007 | Macbeth et al. | |
| 2009/0271762 A1 | 10/2009 | Taylor et al. | |
| 2009/0307042 A1 | 12/2009 | Sunagawa | |
| 2010/0235505 A1 | 9/2010 | Gupta et al. | |
| 2013/0086079 A1* | 4/2013 | Chaudhuri | G06Q 50/01 707/748 |
| 2014/0222712 A1 | 8/2014 | Samaha et al. | |
| 2014/0223342 A1 | 8/2014 | Hood et al. | |
| 2014/0278638 A1 | 9/2014 | Kreuzkamp et al. | |
| 2014/0279832 A1 | 9/2014 | Vivalda et al. | |
| 2014/0365511 A1 | 12/2014 | Burrows et al. | |
| 2017/0103360 A1* | 4/2017 | Ristock | H04L 67/42 |

OTHER PUBLICATIONS

Kataev, Michael et al. Recommending Information System of the Enterprise Control Based on Business Processes. Sixth International Conference on Enterprise Systems (ES) (pp. 30-35). (Year: 2018).*

Australian Examination Report No. 1 for Australian Patent Appln. No. 2017201108 dated Sep. 9, 2017, 6 pages.

Australian Examination Report No. 1 for Australian Patent Appln. No. 2017201109 dated Aug. 24, 2017, 5 pages.

Edward J. Barkmeyer et al., "Concepts for Automating Systems Integration", National Institute of Standards and Technology, Technology Administration, U.S. Department of Commerce, Feb. 2003, 90 pages.

Examination Report No. 4 for Australian Application No. 2017201108, dated Sep. 6, 2018, pp. 1-4.

Examination Report No. 3 in Australia Patent Application No. 2017201108 dated Jul. 19, 2018, pp. 1-4.

Non-Final Office Action, and References, for U.S. Appl. No. 15/435,690, dated Jan. 10, 2019, pp. 1-19.

Australia Patent Office, Examination Report No. 2 for Australia Patent Application No. 2017201108 dated Jan. 30, 2018, pp. 1-3.

Australian Examination Report No. 1, dated Oct. 30, 2019, pp. 1-3, issued in Australian Patent Application 2018226460, Offices of IP Australia, Woden, ACT, Australia.

U.S. Office Action, dated Jul. 30, 2019, pp. 1-22, issued in U.S. Appl. No. 15/435,690, U.S. Patent and Trademark Office, Alexandria, VA.

U.S. Office Action, dated Jan. 16, 2020, pp. 1-21, issued in U.S. Appl. No. 15/435,690, U.S. Patent and Trademark Office, Alexandria, VA.

Examination Report No. 2 issued in Australian application No. 2018226460 dated Apr. 3, 2020, 2 pages.

* cited by examiner

RESOURCE VIRTUALIZATION

PRIORITY CLAIM

This application claims priority to U.S. provisional application Ser. No. 62/297,473, filed 19 Feb. 2016, which is entirely incorporated herein by reference.

TECHNICAL FIELD

This application relates to virtualization of geographically distributed resources.

BACKGROUND

The global proliferation of high speed communication networks has created unprecedented opportunities for geographically distributed resource interaction. However, while the opportunities exist and continue to grow, the realization of those opportunities has fallen behind. In part, this is due to the enormous technical challenges of finding the resources, evaluating them, and providing an environment in which the resources can effectively interact.

DETAILED DESCRIPTION

Effectively identifying, evaluating, communicating with, and connecting with the resources needed to successfully accomplish complex projects is a significant technical challenge. The virtualization architecture described below provides technical solutions to finding and analyzing geographically distributed resources that may be allocated to execution of a complex task. The architecture provides a central control mechanism for discovering, monitoring, connecting, and updating resources that can be discovered and allocated to carry out any given project.

Figure 1:
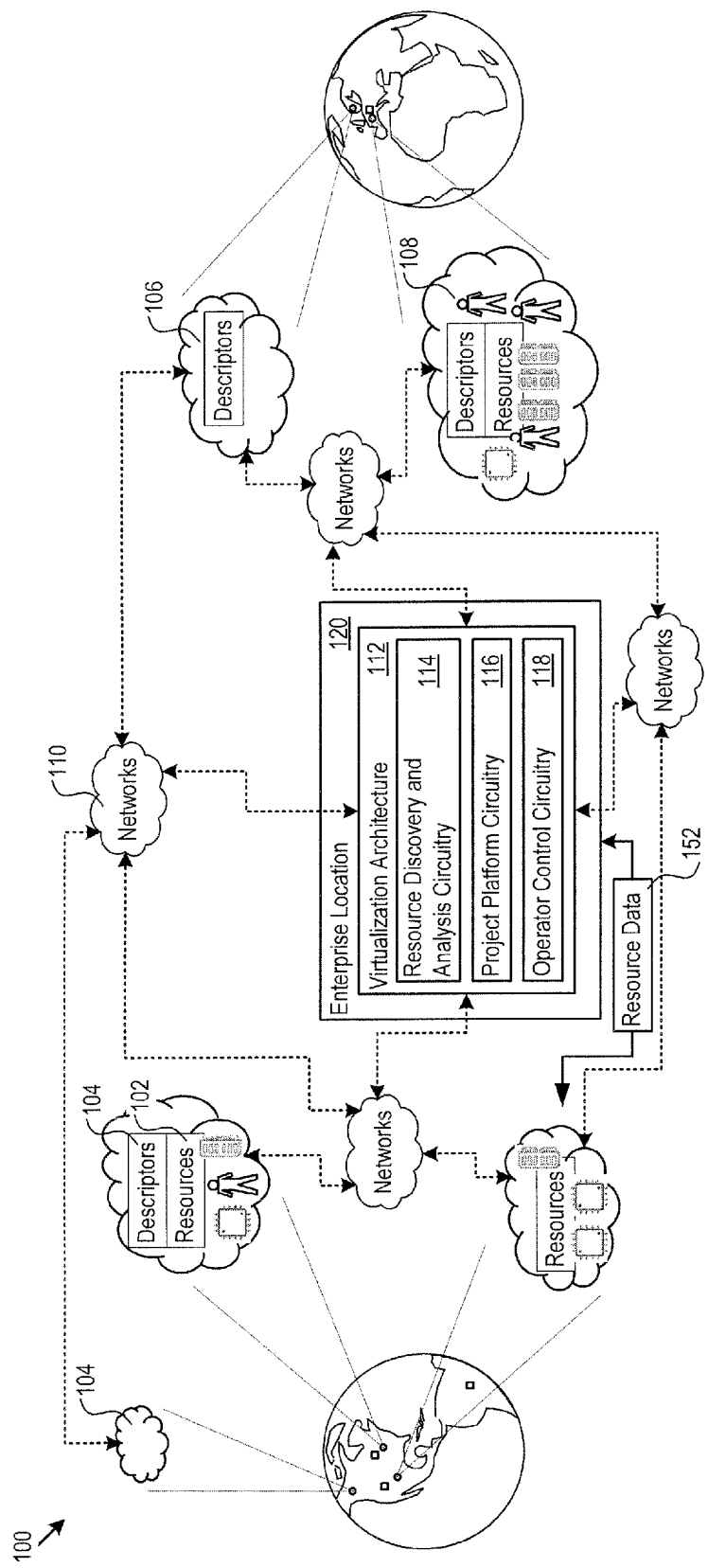
FIG. 1 shows an example of a global network architecture.
Figure 2:
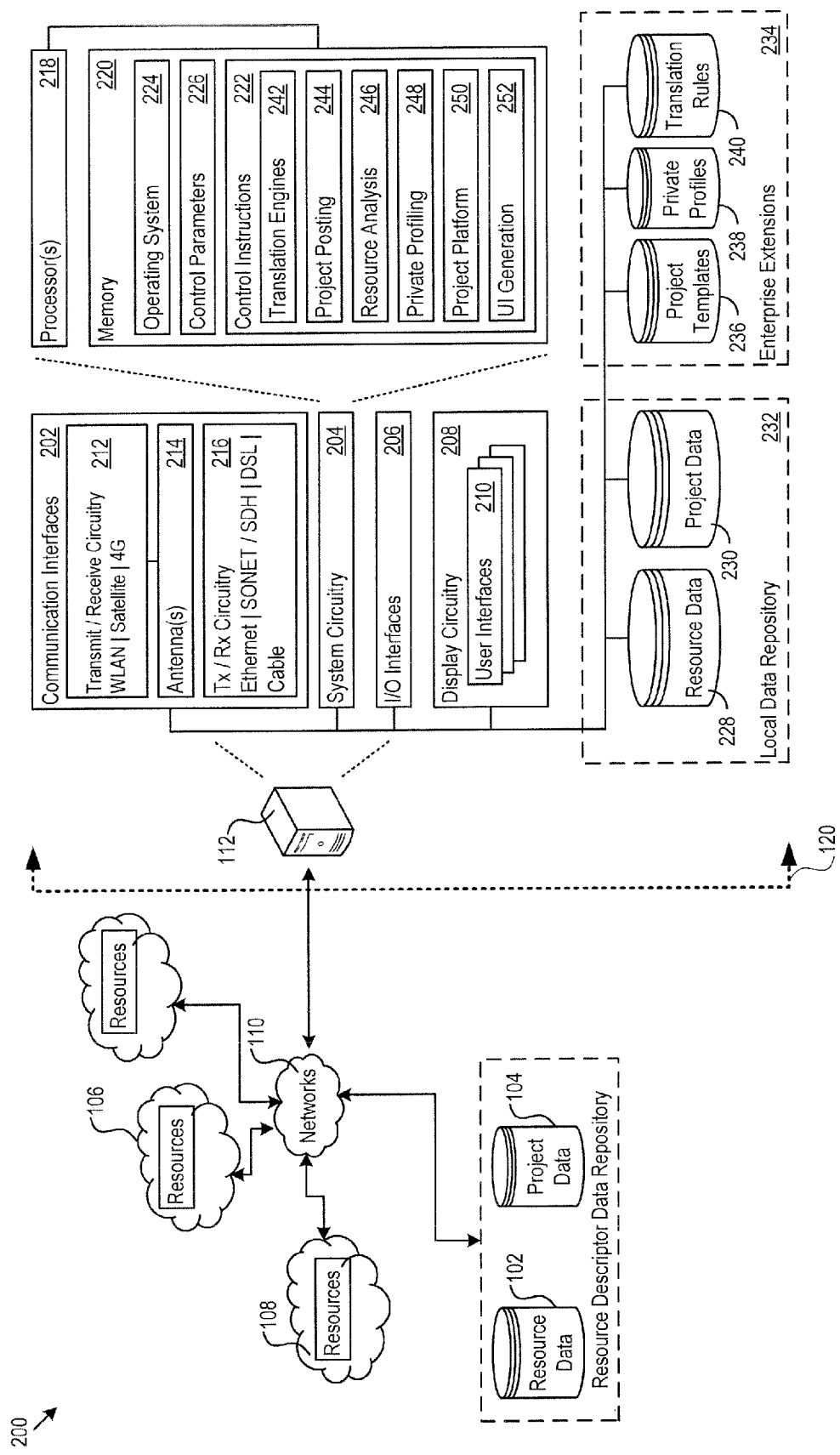
FIG. 2 illustrates an example implementation of a virtualization architecture.

FIGS. 1 and 2 provide an example context for the discussion below of the technical solutions in the architecture. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are resources, e.g., the resources 102, and sources of information about the resources. Information characterizing the resources is also referred to as resource descriptors, e.g., the resource descriptors 104. These resources and resource descriptors may be present at many different resource sites globally, and for certain types of resources (e.g., virtualized computing resources) the resource sites are service providers that host the resources, e.g., the service providers 106 and 108. The resource sites, resources and resource descriptors may be located in any geographic region, e.g., United States (US) East, US West, or Central Europe. Resources may correspond to any element of project execution, whether specific individuals, algorithm packages, or hardware and software resources. The resource descriptors may correspond to resource data that characterizes, defines, or describes the resources, such data specifying abilities, speed, reliability, location, availability, cost, capability, capacity, experience, skill descriptors, historical performance data, and execution capability data. Further, resources and resource descriptors may also be present locally within an enterprise that seeks to carry out a project, in addition to being geographically distributed.

Throughout the global network architecture 100 are networks, e.g., the network 110. The networks provide connectivity between the resources, resource descriptors, service providers, enterprises, and other globally positioned entities. The networks 110 may include private and public networks defined over any pre-determined and possibly dynamic internet protocol (IP) address ranges.

A virtualization architecture 112 performs complex workforce virtualization resource discovery and analysis. As an overview, the virtualization architecture 112 may include resource discovery and analysis circuitry 114, project platform circuitry 116, and operator control circuitry 118. The resource discovery and analysis circuitry 114 implements locating resources to potentially fill roles for a project across the geographically distributed resources. The project platform circuitry 116 supports ad-hoc selection and cooperation of resources to execute a project. The project platform circuitry 116 may be a plug-and-play, vendor-agnostic platform that integrates cloud-based development and content creation tools, collaboration, document management, and cloud-based resource and task management tools, with advanced interfaces that link teams of resources to these tools.

Resource data 152 flows between the virtualization architecture 112, the resources, and the resource sites. Examples of resource data include resource location, availability, cost, experience, and other skill descriptors, historical performance data, execution capability data, and other resource information. The virtualization architecture 112 also includes operator control circuitry 118. The operator control circuitry 118, among other functions, is configured with a set of (for example) graphical user interfaces (GUIs) for project definition and description, resource discovery and review, cooperative execution of projects across geographically distributed resources, resource evaluation and feedback, and other technical tasks.

The circuitry described above may be implemented and running, for instance, at a specific location operated by the enterprise 120. The enterprise location may support, for a specific enterprise, resource evaluation, discovery, selection, characterization, search, and other functionality. That is, as the enterprise 120 attempts to complete complex projects, the circuitry in the virtualization architecture 112 facilitates identifying, evaluating, communicating with, connecting to, and assigning resources for competing the project. Resource sites that are not under the control of the enterprise 120 and that define their own resource description and tracking ecosystem are referred to as external resource sites below.

FIG. 2 shows an example implementation of the virtualization architecture 112. The virtualization architecture 112 includes communication interfaces 202, system circuitry 204, input/output (I/O) interfaces 206, and display circuitry 208. The user interface (UI) generation instructions 252 generate the UIs 210 locally using the display circuitry 208, or for remote display, e.g., as HTML output for a web browser running on a local or remote machine. Among other interface features, the UIs 210 may facilitate project and resource definition as well as resource selection, evaluation, allocation, and connection to a project. The UIs 210 and the I/O interfaces 206 may include graphical user interfaces (GUIs), touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the virtualization architecture 112, including the resource discovery and analysis circuitry 114. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the virtualization architecture 112. The control parameters 226 provide and specify configuration and operating options for the control instructions 222, operating system 224, and other functionality of the virtualization architecture 112.

The virtualization architecture 112 may include any number of local data repositories, e.g., the data repositories 232 and 234, that include volume storage devices, e.g., arrays of disk drives. The storage devices may store databases that the control instructions 222 access, e.g., through a database control system, to perform the functionality implemented in the control instructions 222 and perform the functionalities described below.

In the example shown in FIG. 2, the databases include a resource data database 228 that stores, e.g., resource characteristic data (including reviews and evaluations) of resources that may be assigned to projects, and a project data database 230 that stores, e.g., data describing previously defined projects. In addition, any network connected entity may store its own set of resource data and project data that describe, e.g., projects and resources known to or available locally from that entity. The virtualization architecture 112 may connect to any desired source of such data in making resource search, evaluation, and selection decisions.

Further, any enterprise may define and establish additional databases, such as the project templates database that stored the project templates 236, the private profiles database 238, and the translation rules 240. The project templates database may store a predefined template as a starting point for posting a resource request for resources needed to execute any given project. That is, the project templates may pre-define the project roles and resource types (e.g., CISC microprocessors or memory type), numbers (e.g., 4 CPU cores and 16 GB or DRAM), cost, availability (e.g., hosted in the EU region with 99% uptime), skills, and other resource attributes needed or desired for any given project. The enterprise may efficiently edit and reuse the templates as a starting point to defining any particular project for which resources are required. That is, the templates help the enterprise avoid starting over in every instance in its search for resources.

The private profiles database 238 stores resource descriptor data that provides insight that further drives resource evaluation and selection. In public resource markets, an enterprise may work with the same resources many times. Relying only upon public profile data for resource evaluation and selection is problematic because public profile reviews may often be skewed toward the positive or negative ends of the spectrum. Further, public profile data does not typically use the terminology known within the enterprise that needs to complete its project. The private profiles database 238 provides a private profile extension to public profile data. The private profiles are typically maintained in confidence inside the enterprise 120. The enterprise 120 creates and maintains the private profiles to capture descriptors of the quality of service provided by the resource in the past, e.g., error rate, up-time, timeliness, responsiveness and other descriptors. To facilitate resource evaluation and selection, the virtualization architecture 112 may display public profile data alongside the private profile data for any given resource under consideration, e.g., in a single portal web page). In that way, the enterprise 120 may maintain and display a privately curated and proprietary source of resource analysis data for use by those within the enterprise 120.

The control instructions 222 drive the functionality of the virtualization architecture 112. Described in more detail below, the control instructions may include translation engines 242 responsive to translation rules 240. In addition, project posting instructions 244 facilitate preparing and communicating resource requests for a project to other network connected entities, while the resource analysis instructions 246 facilitate reviewing and ranking potential resources that may be assigned to a project. The private profiling instructions 248 present an interface through which the private profiles are created, updated, and deleted. The project platform instructions 250 dynamically specify, build, and tear-down project execution environments through which selected resources collaborate to complete projects.

The translation rules 240 are one example control structure that provides direction to translation engines 242 in the virtualization architecture 112. The translation rules 240 may include terminology mapping rules and terminology dictionaries that facilitate, for instance, creation and posting of resource requests composed with enterprise-specific terminology. The translation rules 240 facilitate automatic translation of the resource request written in the enterprise-specific terminology (e.g., "C++ Expert"), via the translation engines 242, to the terminology of any pre-determined resource provider (e.g., "More than 10 years of C++ experience."). In this manner, the resource provider receives the resource request and responds to the resource request using its own native terminology, and the virtualization architecture 112 sends the resource request and receives responses in its own native terminology.

The data repositories 232 and 234, control instructions 222, control parameters 226 I/O interfaces 206 and the structure and content of the generated GUIs improve the functioning of the underlying computer hardware itself. That is, these features (among others described below) are specific improvements in way that the underlying computer system operates. The improvements facilitate more efficient, accurate, consistent, and precise search, location, and selection of the best resources for completing a complex task, across a wide range of enterprises and types of tasks and resources, whether local or remote, with enhanced private profile feedback informing the processes. The improved functioning of the underlying computer hardware itself achieves further technical benefits. For example, the virtualization architecture 112 avoids lack of automation, reduces manual intervention, reduces the possibility for human error, and therefore increases task completion efficiency and reduces wait times.

The resource virtualization architecture 112 solves the enormous technical challenges of finding and evaluating resources. Several functional units are addressed below, including private profiles, translation engines, and resource search templates. Any implementation of the resource virtualization architecture 112 may include any of these functional units in any combination.

Translation Engines

Figure 3:
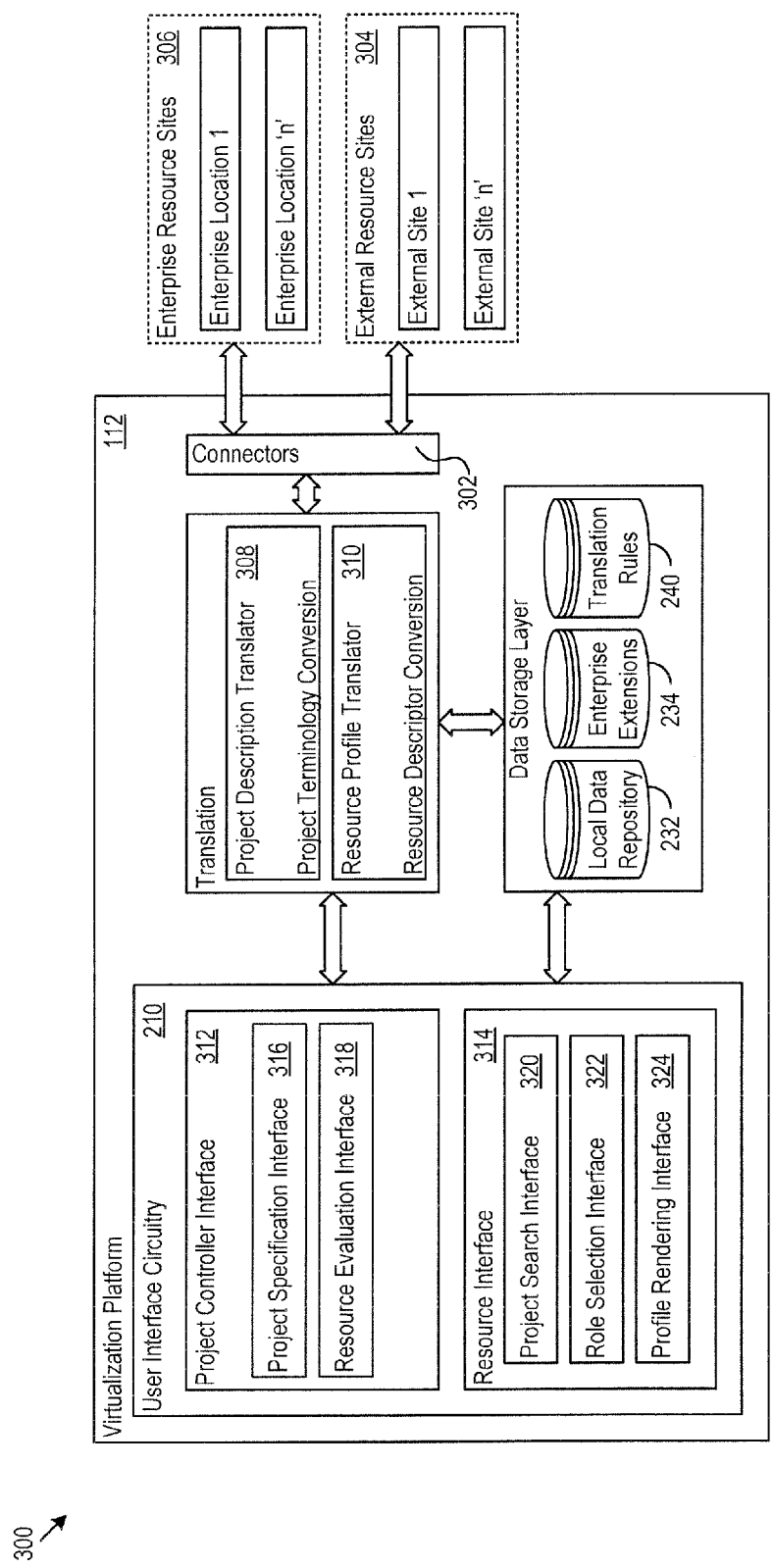
FIG. 3 shows another example implementation of a virtualization architecture.

FIG. 3 shows one example of architectural components 300 that may implement the functional units noted above in the resource virtualization architecture 112. The resource virtualization architecture 112, through the connectors 302, exchanges project and resource data with external resource sites 304 and enterprise resource sites 306. The connectors 302 may be implemented as web data connectors (WDC), for instance, configured to read data from virtually any resource site that provides data in JSON, XML, HTML, or other formats. That is, the resource virtualization architecture 112 in place at any given enterprise location may communication with other enterprise resource sites to exchange resource, project data, and private profiles, and with the external resource sites to exchange resource and project data.

Note also that the virtualization architecture 112 implements project description translators 308 and resource profile translators 310. The project description translators 308 are configured to convert enterprise-specific terminology for resource discovery requests (e.g., a job posting) to external-site terminology, and vice versa. The resource profile translators 310 are configured to convert enterprise-specific terminology for resource descriptors (e.g., a description of resource characteristics) to external-site terminology, and vice versa. One of the technical challenges solved by the virtualization architecture 112 is that the enterprise may have its own way of describing projects and resource requirements for the project, different from any given external resource site. The translators 308 and 310 map the enterprise specific terminology to the terminology of any given external site with which the virtualization architecture 112 communicates.

An example of the operation of the project description translator 308 is shown below in Table 1, and an example of the operation of the resource profile translator 310 is shown below in Table 2. These examples proceed with regard to a new project underway for a smartphone gaming application that requires core logic designer, a GUI developer, and a CPU/AI strategy programmer. The examples show how the translation rules 240 might recognize words and phrases to convert a resource discovery request for the gaming application project to the terminology in place at two different external resource sites. The external resource sites may then publish the resource discovery request using their particular terminology.

In one implementation, the translators 308/310 include translation tables with discrete entries that map vocabulary, e.g., words, phrases, and sentences between systems. For instance, "trained" may map to "experienced" and "advanced" may map to "more than 3 years of experience." In other implementations, the translators 308/310 a manual translation may occur, with the virtualization architecture 112 executing a machine learning process to learn the translation, and perform the translation automatically in future instances. Other implementations may include natural language processing engines to understand and translate project descriptions and resource profile descriptions from one set of terminology or language to a different set of terminology or language.

Note that the project description translator 308 and resource profile translator 310 may also operate in the other direction. That is, the project description translator 308 and resource profile translator 310 may also convert a resource discovery request and resource descriptors obtained from a given external resource site into the terminology in place at the enterprise location, so that local resources may view the resource discovery request in a form with which they are familiar.

TABLE 1

| | Enterprise Location Running the Virtualization Architecture 112 | |
| --- | --- | --- |
| | External Resource Site A | External Resource Site B |
| Project Description | Site A Translation | Site B Translation |
| Project Name: Mighty Zeus | Name: Mighty Zeus | Title: Might Zeus |
| Project Type: Multi-player Smartphone Game | Category: Smartphone Gaming | Field: Multiplayer Gaming Application |
| Start Date: Feb. 1, 2017 | Start: Feb. 1, 2017 | From Feb. 1, 2017 |
| End Date: Aug. 1, 2017 | Duration: 6 months | to Aug. 1, 2017 |
| Role: Engine coder | Staff: C++ coder | Talent: Core logic coder |
| Role: GUI designer | Staff: User interface creator | Talent: Machine interface coder |
| Role: Strategy logic coder | Staff: AI coder | Talent: CPU intelligence programmer |

TABLE 2

|  | Enterprise Location Running the Virtualization Architecture 112 | |
| --- | --- | --- |
|  | External Resource Site A | External Resource Site B |
| Resource Description Component | Site A Translation | Site B Translation |
| "10+ years of C++ experience." | "C++ expert." | "C++ level 5." |
| "Android UI design." | "Mobile GUI experience." | "Two or more years of smartphone human interface design." |
| "Basic experience with online gaming message protocols." | "Multiplayer/LAN gaming experience." | "Experience with networked gaming community interaction features." |
| "Single player CPU intelligence design." | "AI coder." | "Non-player character intelligent behavior design." |

Expressed another way, the virtualization architecture 112 allows an enterprise to generate a resource discovery request once, using the vocabulary that is in common use within the enterprise. The virtualization architecture 112 may then automatically translate the description into the vocabulary that is used on different external resource sites.

FIG. 3 also shows specific examples of the composition of the UIs 210. In particular, the UIs 210 include a project controller interface 312 and a resource interface 314. These interfaces are described in more detail below with reference to additional drawings.

As an initial matter, the project controller interface 312 includes a project specification interface 316, through which the project controller may define and create a new project (potentially leveraging the project templates 236); and a resource evaluation interface 318, through which a project controller may review and analyze available resources, select resources for a project, provide public resource feedback (e.g., to the external resource sites 304), and create private profile feedback (e.g., stored in the private profiles database 238). The resource interface 314 includes a profile rendering interface 324, through which a potentially interested resource may read and analyze project profiles; a project search interface 320, through which the resource may search for projects of interest; and a role selection interface 322, through which the resource may communicate an indicator of interest or selection of a role currently available for a project.

Project and Role Templates, Resource Discovery with Translation

Figure 4:
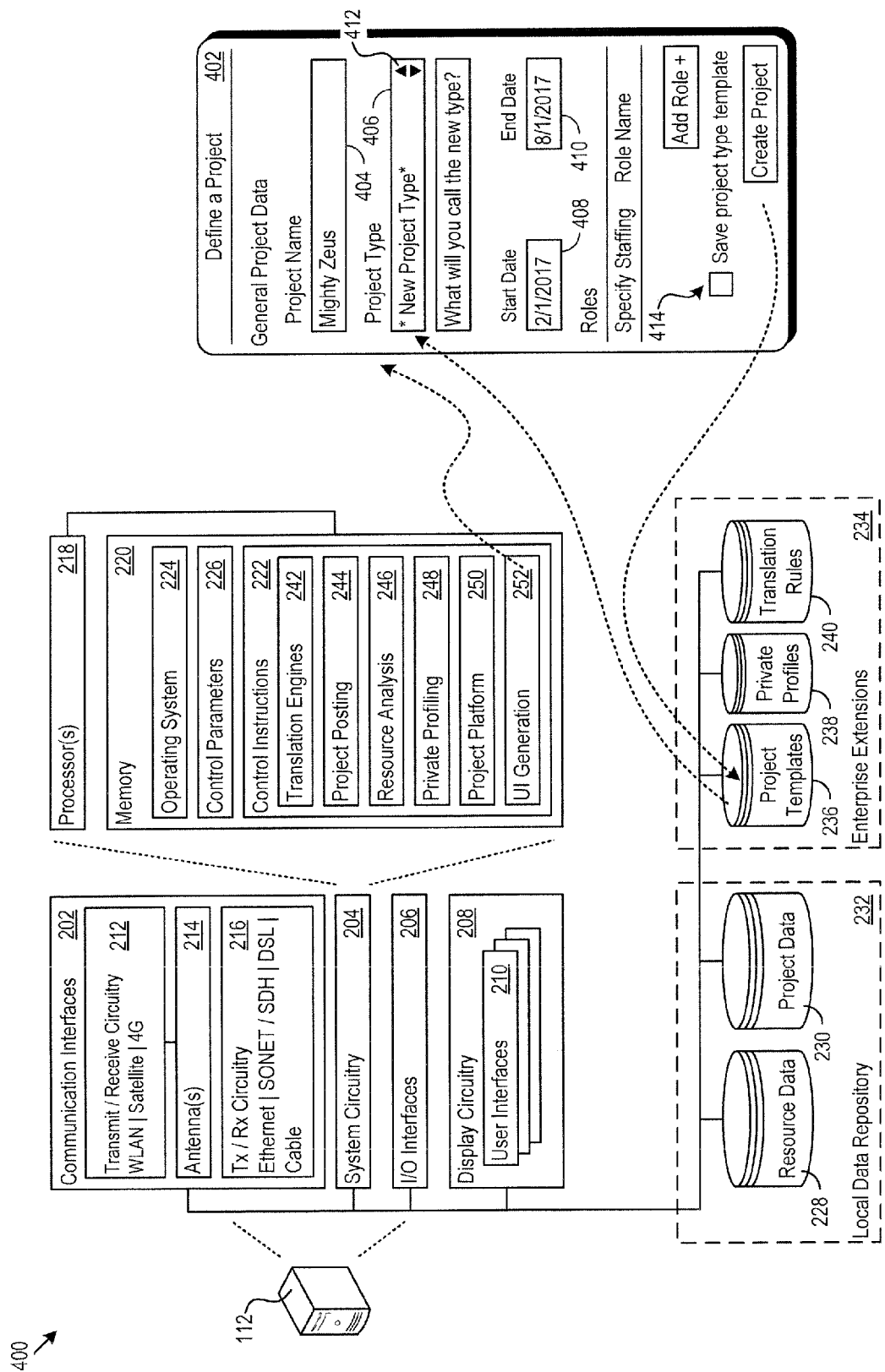
FIG. 4 shows a project definition interface.

FIG. 4 shows an example project definition interface 402, through which a project controller may provide a project name field 404, project type field 406, start date field 408 and end date field 410 for the project. Note that the project type field 406 may query for predefined project types from the project templates 236, and populate, e.g., a drop down selection menu of available project types for selection via the selection interface 412. The project controller may save any newly defined project, including its roles and resource characteristics, in the project templates 236 using the save-project interface 414.

Figure 5:
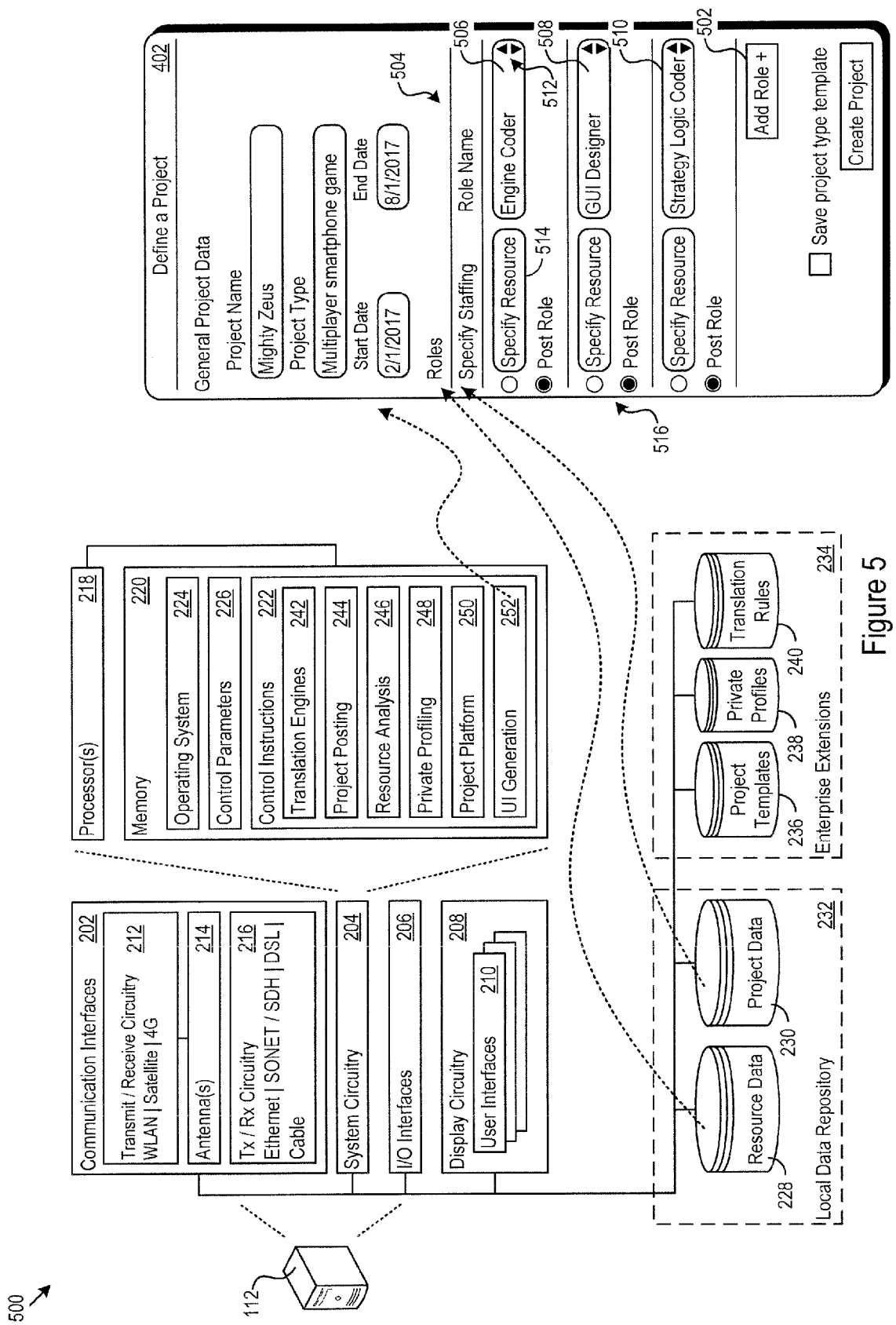
FIG. 5 shows a project definition interface with role components.

As shown in more detail in FIG. 5, the project definition interface 402 further support adding roles to the project via that add-role element 502. When activated, the add-role element 502 adds a new role component to the project in the role definition panel 504. In the example of FIG. 5, three roles are shown specified by staffing type and role name: the Engine Coder role 506, the GUI Designer role 508, and the Strategy Logic Coder role 510.

The role definition panel 504 may also query the project templates 236, given the project type, to discover the application roles for the project. More generally, the interface may query any pre-defined database of roles and make them available for selection via the role selection interfaces, e.g., the role selection interface 512. In addition, the project controller may define new roles by entering a new role name into the role name field. Note also that each role that is added permits the project controller to choose whether to directly specify a resource for that role via a resource specifier field, e.g., the resource specifier field 514. The resource specifier field may, for instance, query resource databases, e.g., the resource data in the resource data database 228, to determine names of individuals who match the role name, and present those role names to the project controller for specifically choosing the resource for the role. The role definition panel 504 also permits the project controller to request issuing a resource discovery request via a discovery request selector, e.g., the discovery request selector 516. The virtualization architecture 112 may respond by, e.g., by posting the role to selected enterprise internal resource sites or, after conversion by the project description translator 308 and resource profile translator 310, to selected external resource sites. In the example of FIG. 5, the project controller has selected to execute a discovery request for a resource to fill each of the three roles noted above in Table 1.

Figure 6:
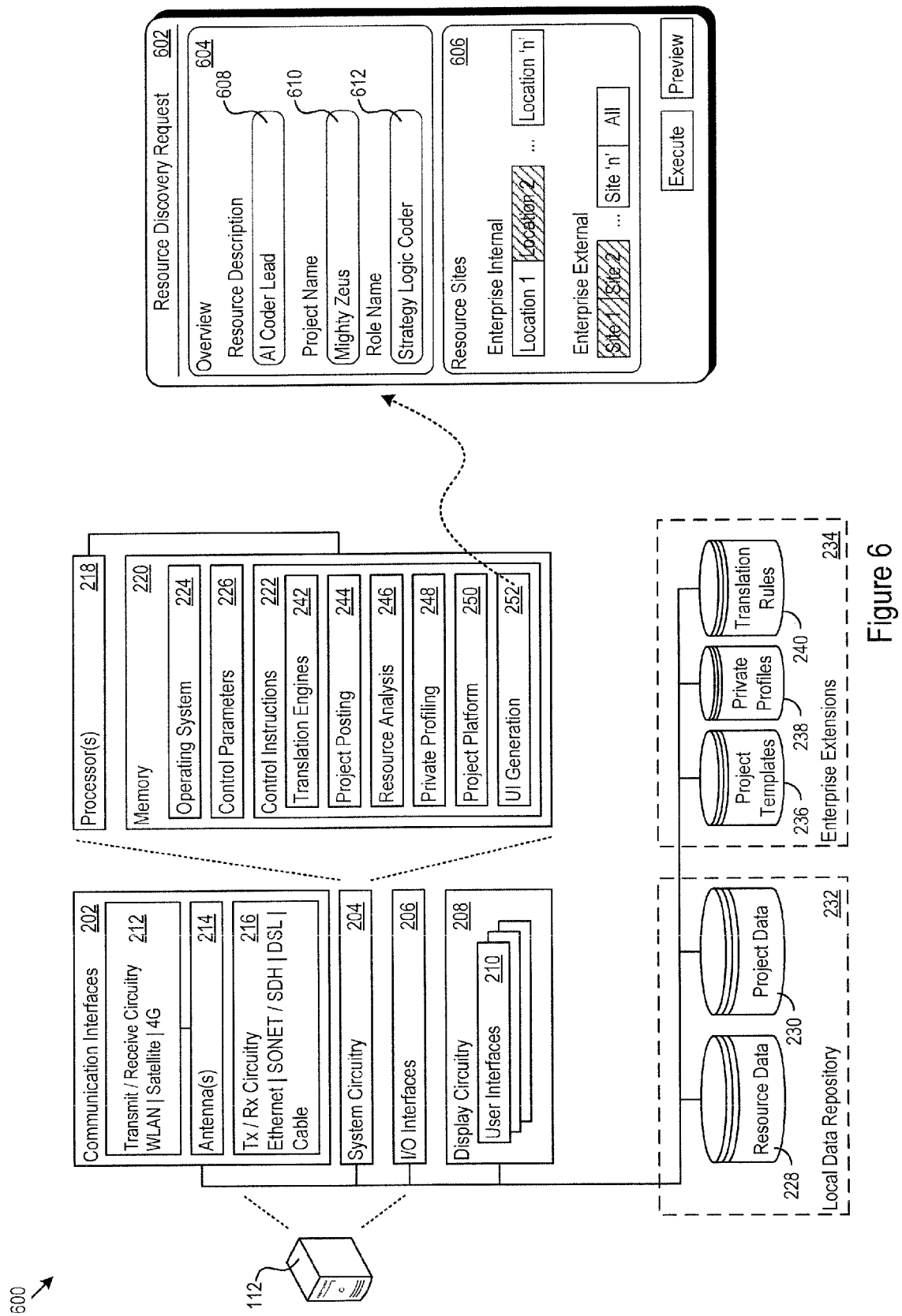
FIG. 6 shows a project definition interface with a resource site selection panel.

FIG. 6 shows a resource discovery request interface 602. The resource discovery request interface 602 includes a description panel 604 and a resource site selection panel 606. The description panel 604 accepts project controller entry of a resource description 608 of the resource sought, e.g., a role title, the project name 610, and the role name 612. The virtualization architecture 112 adds these description items to the resource discovery request, along with additional details described below.

The resource site selection panel 606 accepts selection of the discovery targets for the resource discovery request. In this example, the resource site selection panel 606 includes interfaces for choosing enterprise internal sites, e.g., any of the enterprise resource sites 306, and for choosing enterprise external sites, e.g., any of the external resource sites 304. The virtualization architecture 112 transmits the resource discovery request to the selected sites, after executing any translation operations that convert the terminology in the discovery request to the terminology in use at the receiving resource site.

Figure 7:
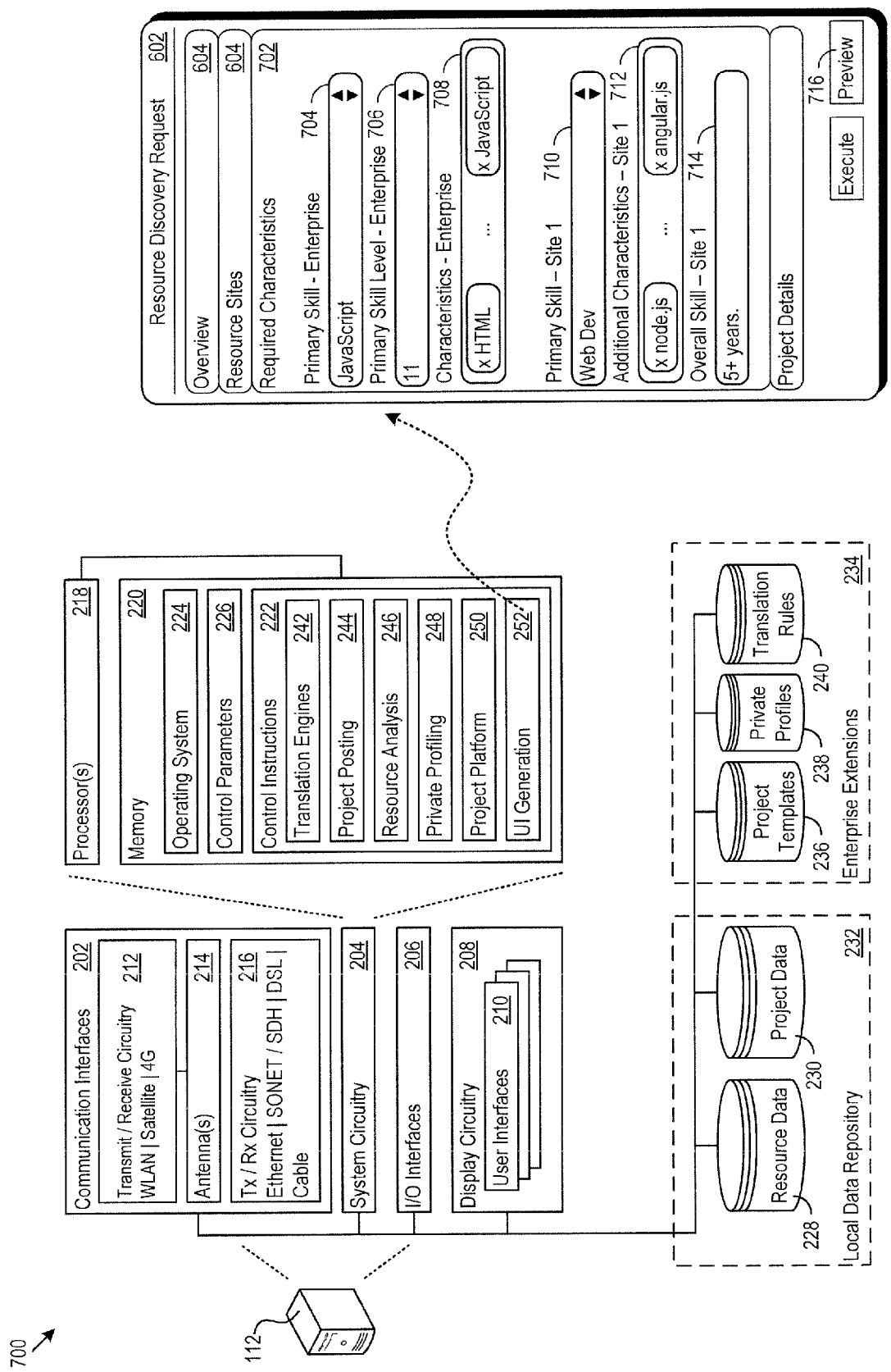
FIG. 7 shows an example of additional detail provided in the resource discovery request interface.

FIG. 7 shows an example of additional detail provided in the resource discovery request interface 602, to accompany the resource discovery requests. In particular, the resource request interface 602 also includes a required characteristics panel 702. The required characteristics panel 702 accepts entry of resource requirements to be met when attempting to locate a suitable resource for filling the particular role at hand.

The manner of specifying requirements may vary widely between implementations. In the example of FIG. 7, the required characteristics panel 702 includes a primary skill field 704, in which the project controller may specify a particularly important characteristic for the resource; and a primary skill level field 706, in which the project controller may specify a required level of the primary skill. More specific characteristics are available for entry in the characteristics field 708, e.g., specific skill with HTML, JavaScript, C++, or any other skill. The characteristic fields 704, 706, 708 may provide entry in the terminology of the enterprise in which the virtualization architecture 122 is running. However, the required characteristics panel 702 may also provide a translation preview, generated by the translation engines 308 and 310. That is, the preview option 716 causes the virtualization architecture 112 to generate a preview interface for viewing how the resource discovery request will appear when actually posted to any given external resource provider. In this regard, the project controller can verify the content and presentation of the resource discovery request as it would be seen natively from any external resource providers. In other implementations, the virtualization architecture 112 may provide GUI fields for direct entry of characteristics in the terminology of any other resource site. In those respects, the required characteristics panel 702 includes the primary skill field 710, additional characteristics field 712, and the overall skill field 714, each of which may display or accept entry of words, phrases, rankings, selections, and expressions in the terminology of any external resource site selected by the project controller.

Figure 8:
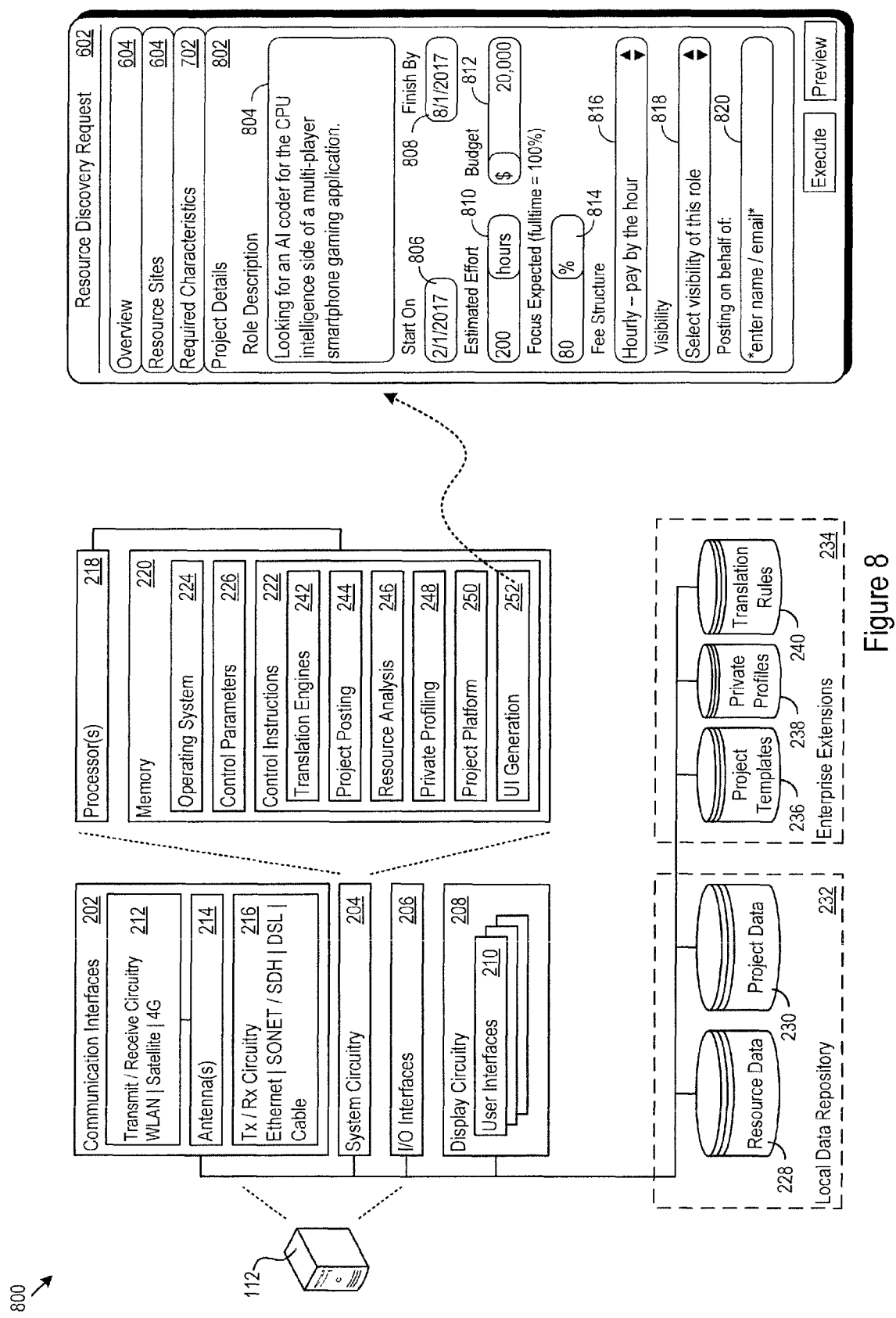
FIG. 8 shows further detail captured in a project detail interface.

FIG. 8 shows another example of additional detail provided in the resource discovery request interface 602, to accompany the resource discovery requests. In particular, the resource discovery request interface 602 also includes a project details panel 802. The project details panel 802 accepts entry of many different types of descriptors for the project that any resource site may analyze and apply when searching for a matching resource.

In FIG. 8, the example discovery request interface 602 includes a role description field 804, a start date 806, end date 808, an estimated effort field 810, and a budget field 812. Further example of project detail fields include the expected focus field 814, the fee structure field 816, and the visibility field 818. The project controller may also note that the discovery request is made on behalf of a particular entity or individual in the entity field 820. The project details panel 802 may provide an entry point for virtually any other project characteristics, such as location (e.g., in a particular office, or at home), employer name, project team members, benefits, employer rating, and the like.

Figure 9:
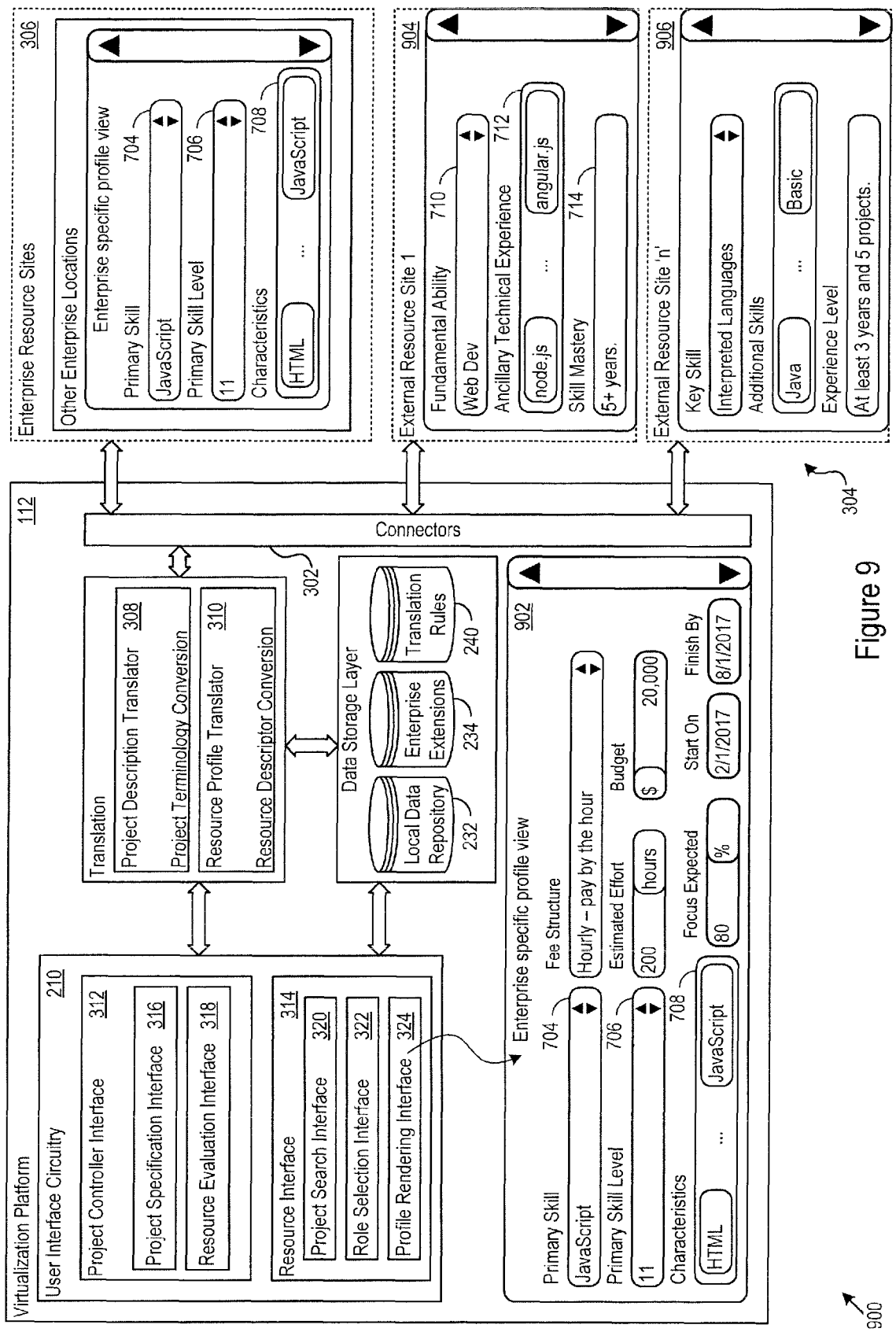
FIG. 9 shows enterprise and external rendering of the project detail.

FIG. 9 shows an example 900 of how the project details are locally rendered for viewing by the enterprise itself, and also translated and displayed at the external resource sites 304. At enterprise resource sites, the profile rendering interface 324 uses the enterprise specific terminology. In the example of FIG. 9, the profile rendering interface 324 has generated the enterprise specific project GUI 902 that uses the enterprise specific terms "JavaScript" and skills "HTML" and "JavaScript" (see FIG. 7). The same is true for other the enterprise resource sites 306.

However, the translators 308 and 310 prepare terminology specific variants of the project and role data on an individual basis for the external resource sites 304. FIG. 9 provides two examples: the site 1 GUI 904 and the site 'n' GUI 906. Continuing the example above, the project and role data for the site 1 GUI 904 reflects the example translation preview shown in FIG. 7 for site 1. Each external resource site 304 receives a translated version of the enterprise project and role profiles appropriate for that site, and generates its own site specific GUI using that translated data.

Private Profiles

Part of the resource selection process includes obtaining and evaluating resource performance data. Resource descriptors 104 may be publicly available from potentially any of the external resource sites 304, as well as from any of the enterprise resource sites 306 of the particular enterprise which is searching for resources to complete an enterprise project. Accordingly, the virtualization architecture 112 connects to and obtains the publicly available resource descriptors 104 from the external resource sites 304 and the enterprise resource sites 306, e.g., as stored in the resource data database 228.

Figure 10:
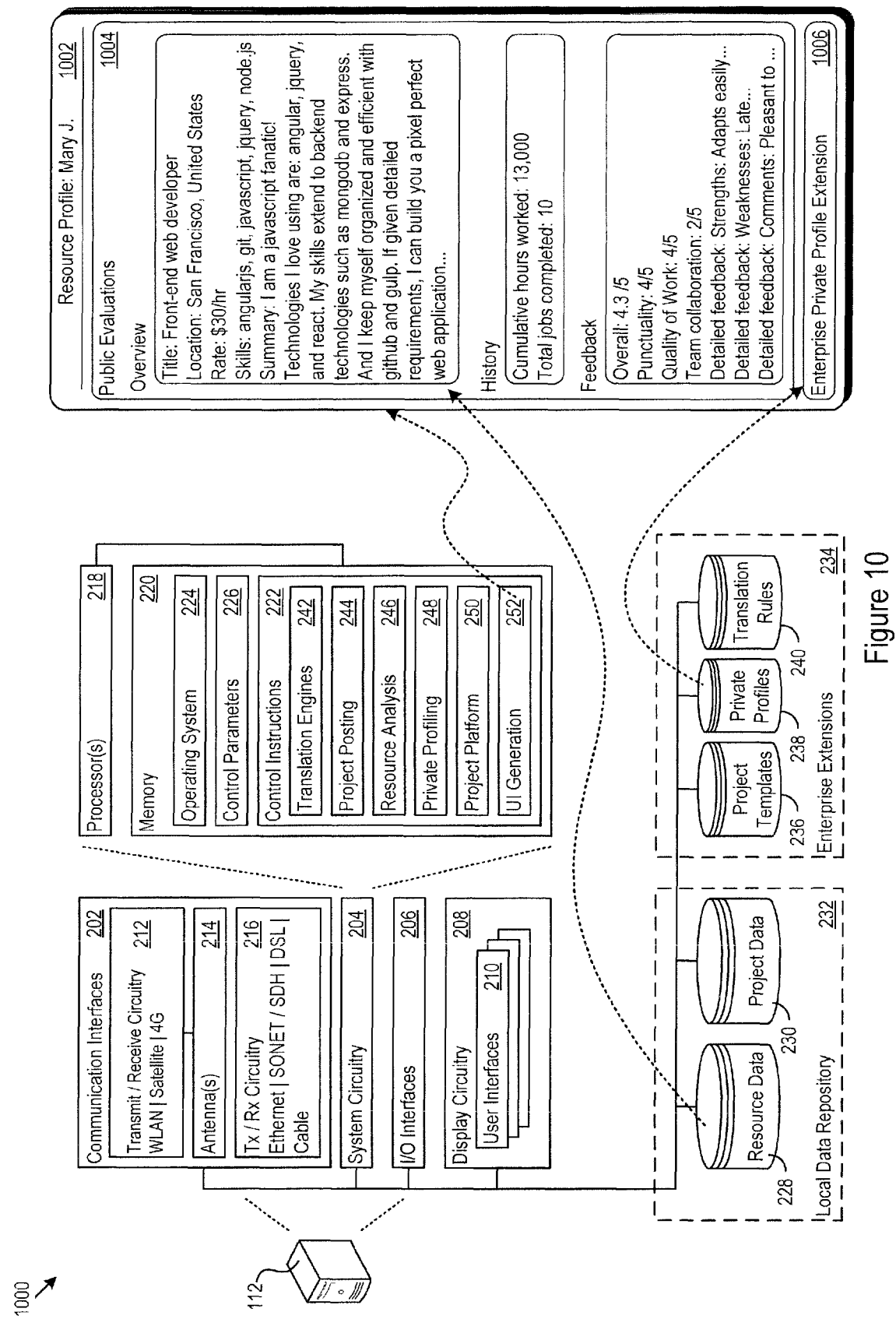
FIG. 10 shows an example of the resource evaluation interface.
Figure 11:
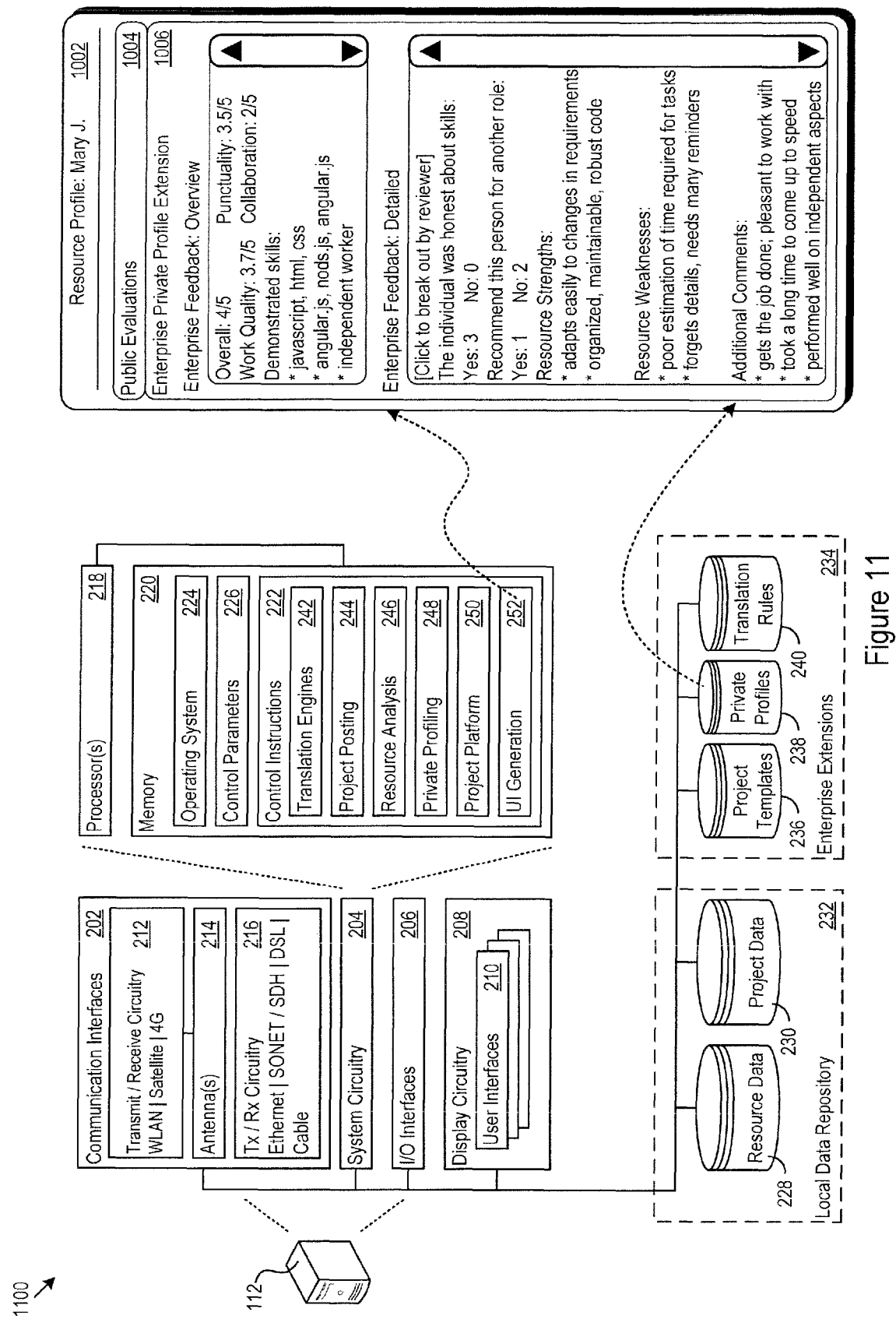
FIG. 11 shows a private profile extension interface within the resource evaluation interface.

The discussion of FIG. 3 noted that the virtualization architecture 112 may generate resource evaluation interfaces 318. FIG. 10 shows a specific example 1000 of such an interface: the resource evaluation interface 1002. The virtualization architecture 112 generates the resource evaluation interface 1002 to include resource data from the resource data database 228, for any given resource under evaluation.

The resource evaluation interface 1002 includes a public evaluation panel 1004. The virtualization architecture 112 populates the public evaluation panel 1004 with non-reserved evaluation details obtained internally to the enterprise and from any number of external resource sites. The details are non-reserved in the sense that they are not proprietary and maintained in confidence within any given enterprise. Examples of non-reserved details include public ratings and comments, resource descriptions created by the resource for review by others (e.g., as part of a resume, or work history description), and public work history records.

The resource evaluation interface 1002 also includes a private profile extension panel 1006. The private profile extension panel 1006 renders enterprise specific resource data obtained from the private profiles database 238. The private profiles are typically maintained in confidence inside the enterprise 120; that is, the private profiles are typically enterprise-specific, and not shared with any external resource sites 304. Project controllers and other entities authorized by the enterprise 120 create and maintain the private profiles for any given resource to capture resource descriptors of the quality of service provided by the resource, e.g., error rate, up-time, timeliness, responsiveness and other descriptors. To facilitate resource evaluation and selection, the virtualization architecture 112 may display public profile data in the public evaluation panel 1004 alongside the private profile data in the private profile extension panel 1006 for any given resource under consideration.

The virtualization architecture 112 may define and implement any per-determined set of private profile data in the private profile database 238. The private profile data may vary widely, depending on the particular enterprise implementation. As such, the examples provided here are only one specific view of private profiles, and they may take widely differing forms between implementations.

Figure 12:
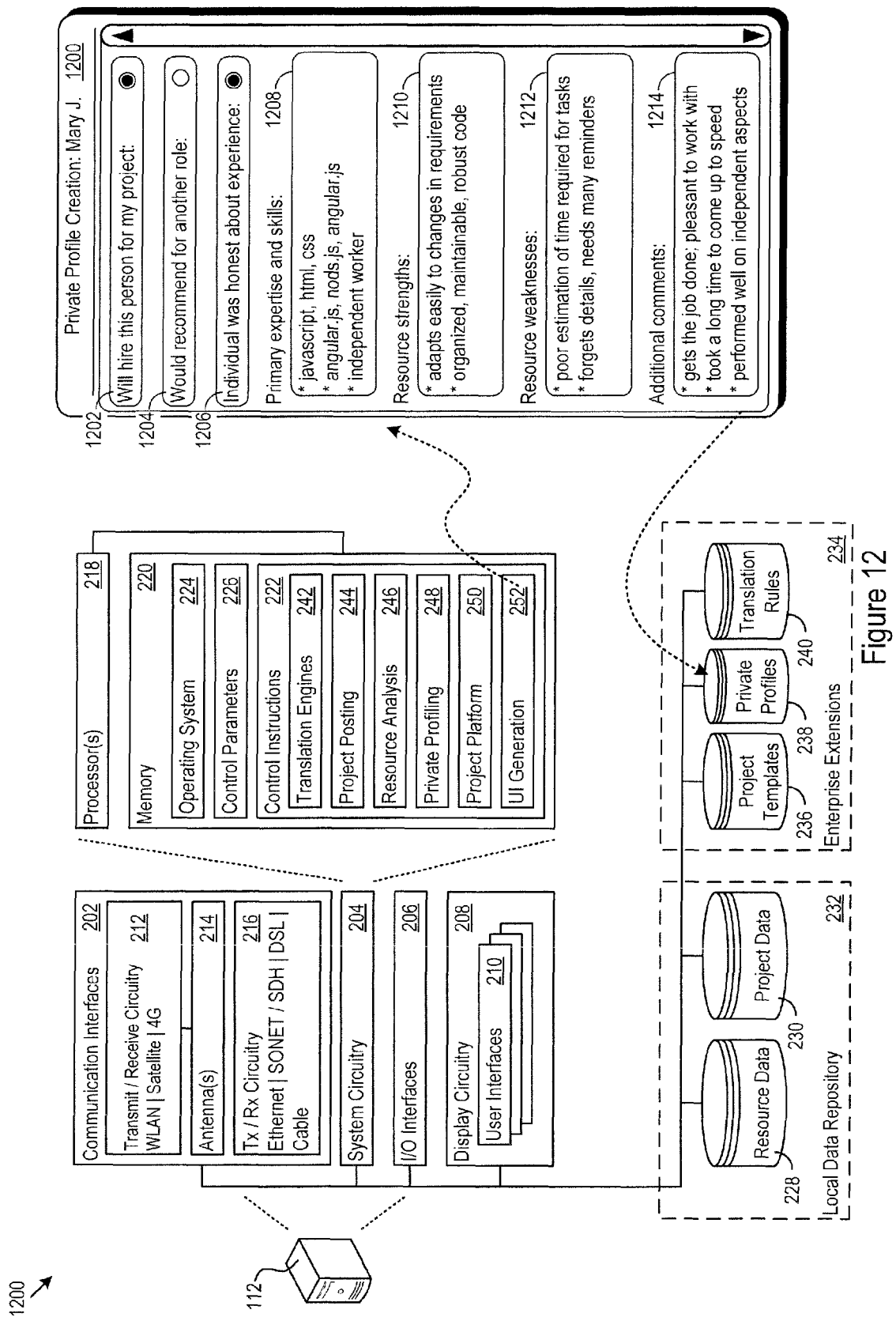
FIGS. 12 and 13 show example private profile creation interfaces.
Figure 13:
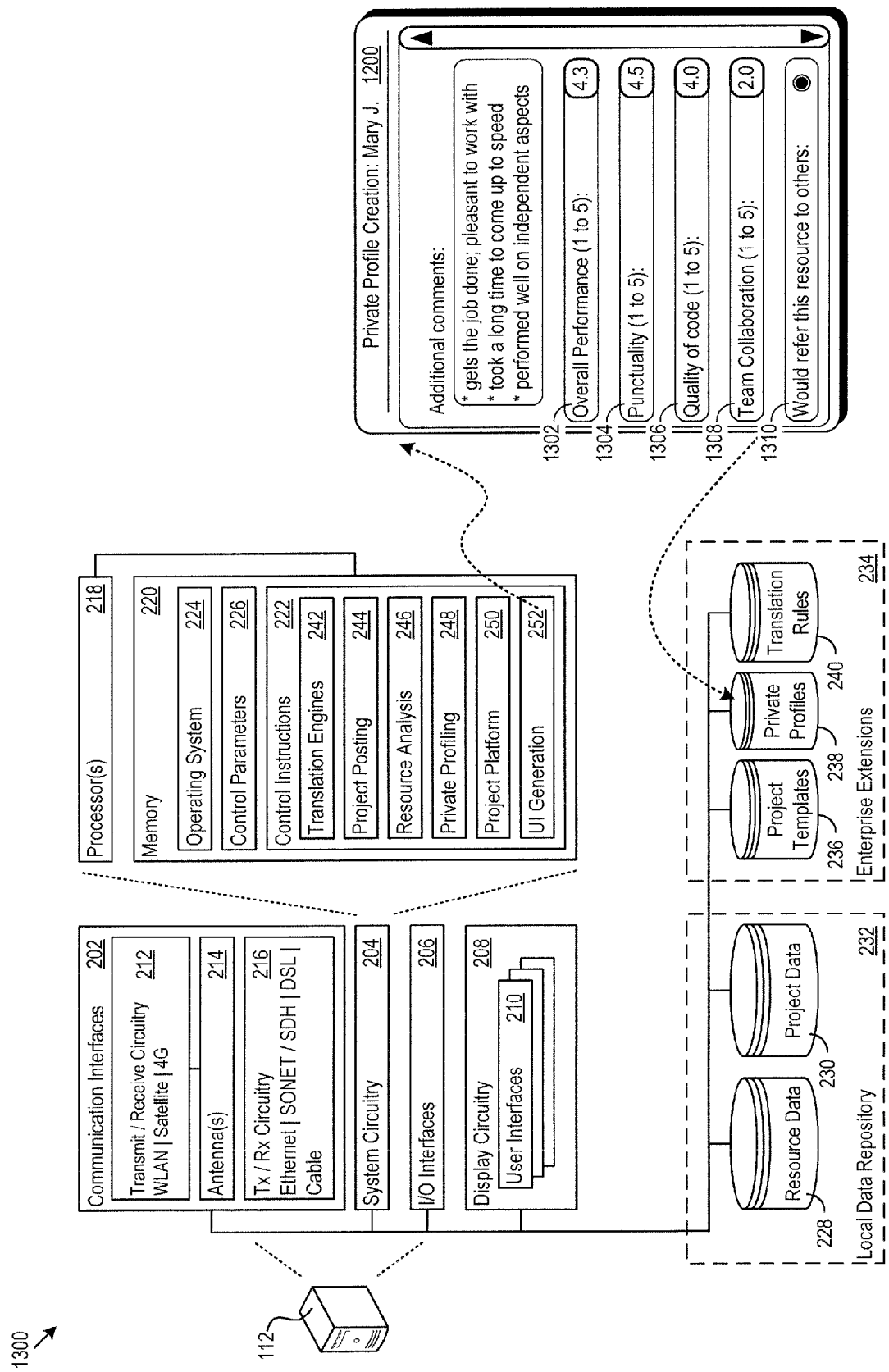

FIGS. 12 and 13 show an example private profile creation interface 1200. In the examples of FIGS. 12 and 13, the private profile creation interface 1200 captures enterprise-specific feedback, including hiring feedback 1202 that indicates whether the resource will be hired, recommendation feedback 1204 as to whether the evaluator would recommend the resource for another project, and honesty feedback 1206 as to whether the resource was honest about their self-reported experience. The interface 1200 also provides a primary expertise field 1208 to capture the primary skills demonstrated by the resource, a strengths field 1210, weaknesses field 1212, and comments field 1214 to capture the strengths and weaknesses of the resource, as well as any additional comments the reviewer wants to provide. Additional private profile details are shown in FIG. 13, including an overall performance rating 1302, a punctuality score 1304, a work product quality score 1306, a team collaboration score 1308, and a reference indicator 1310 of whether the evaluator would refer the resource to others.

Figure 14:
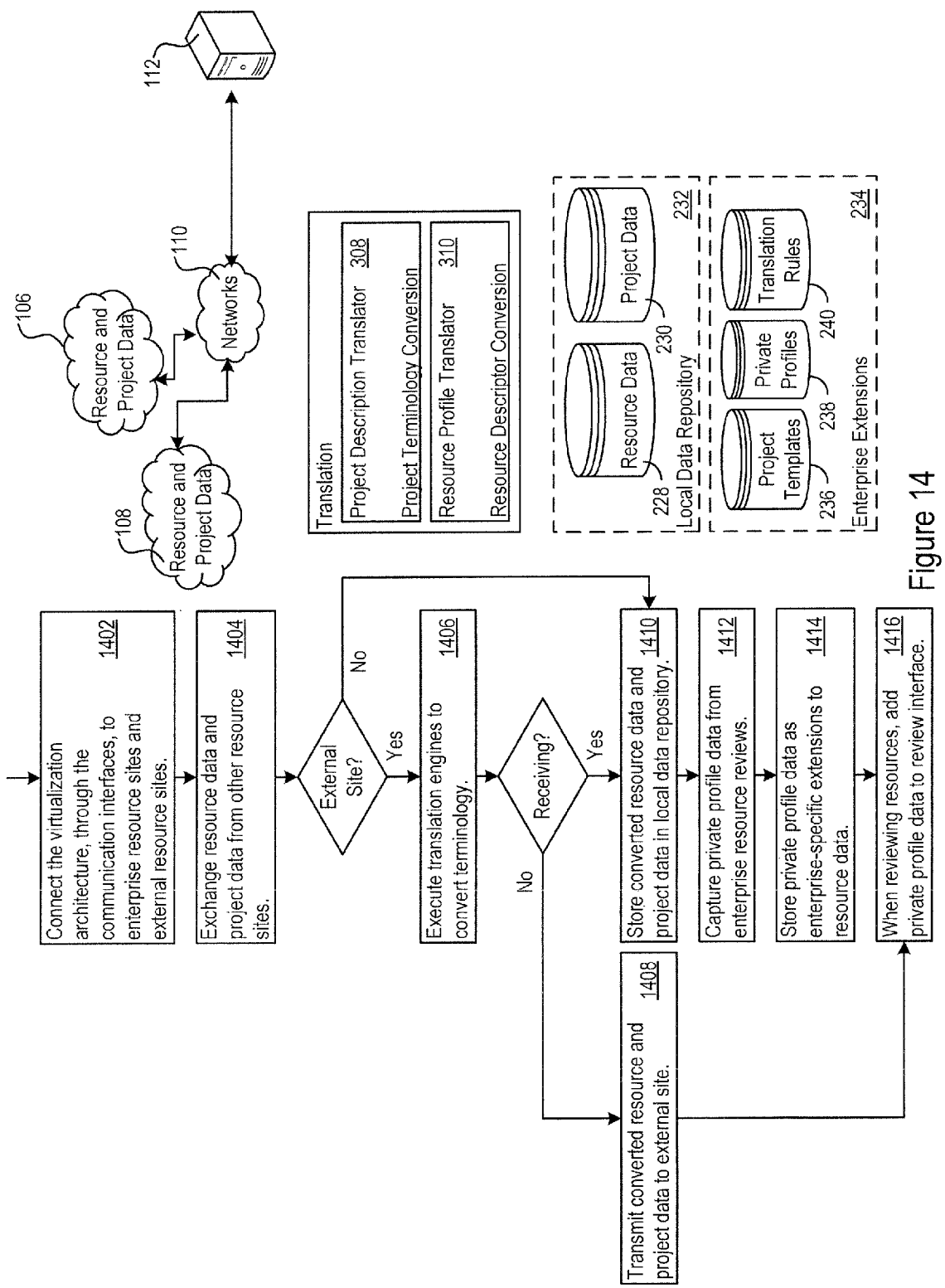
FIGS. 14 and 15 show logic that a virtualization architecture may implement.

FIG. 14 shows logic 1400 that a virtualization architecture 112 may implement in connection with the resource descriptor sharing and translation functionality described above. The logic 1400 includes connecting the virtualization architecture 112, through the communication interfaces 202 to enterprise resource sites 306 and external resource sites 304 (1402). The logic 1400 exchanges resource descriptors and project data with the other resource sites (1404). When the resource site employs a terminology set that significantly differs from the enterprise site implementing the virtualization architecture 112, the logic 1400 may execute the translation engines 308/310 to convert the terminology (1406).

When the virtualization architecture 112 is communicating resource and project data to other resource sites, the logic 1400 transmits the converted (if performed) resource and project data to the external resource site (1408). Otherwise, when receiving, the logic 1400 stores the converted (if performed) resource data and project data in the data repository 232 (141). To supplement the resource and project data, the logic 1400 also generates private profile creation interfaces, and captures private profile data from enterprise resource reviewers (1412). The private profile database 238 stores resource descriptor data maintained, e.g., in confidence to support enterprise specific review and analysis of potential resources for a project (1416).

Figure 15:
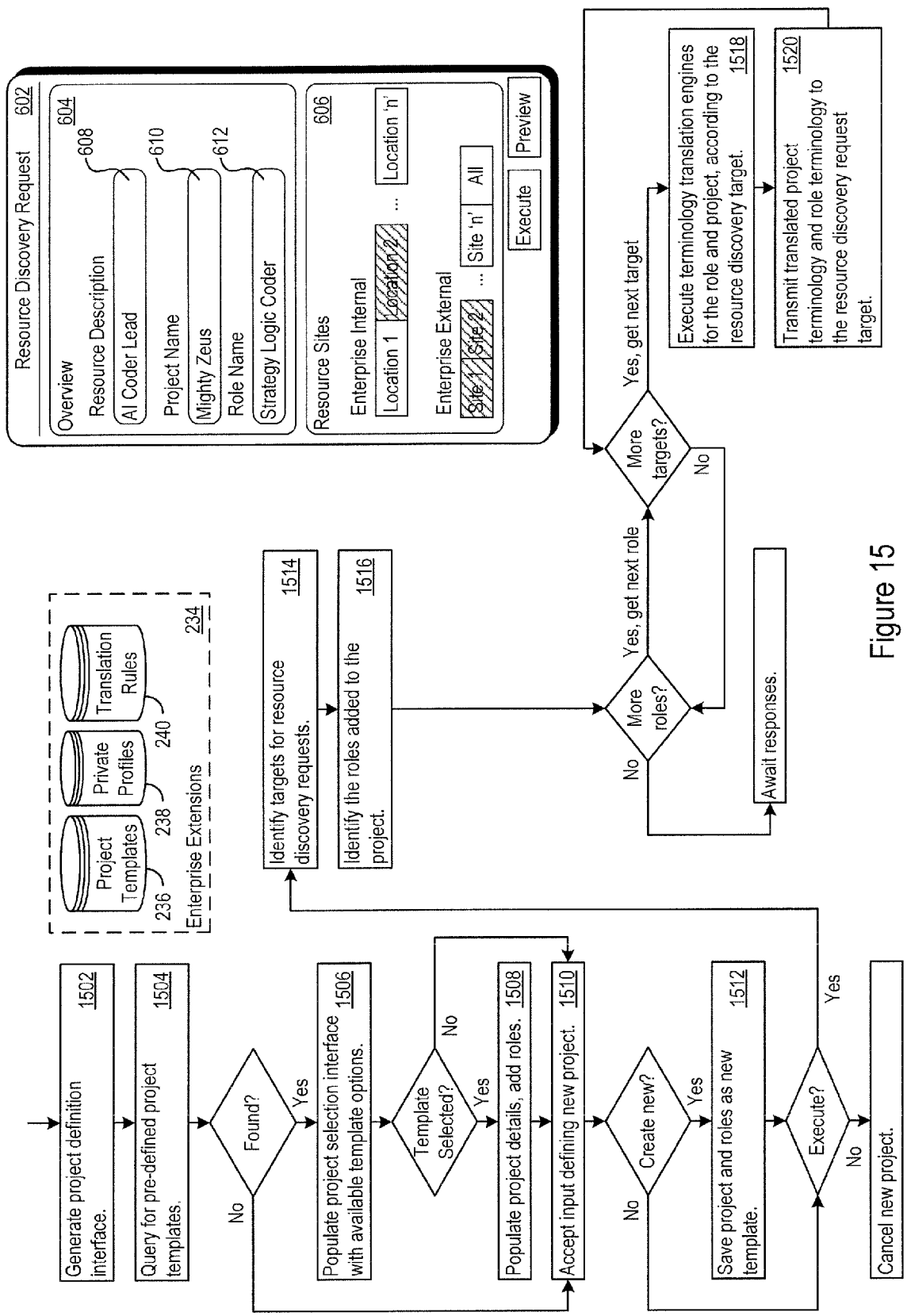

FIG. 15 shows additional logic 1500 that a virtualization architecture 112 may implement in connection with the project creation functionality described above. The logic 1500 generates a project definition interface, e.g., the project definition interface 402 (1502). The logic 1500 also queries for pre-defined project templates in the project template database 236 (1504). If any are available, the logic 1500 populates a selector element in the project selection interface with available template options (1506). When a template project is selected, the logic 1500 populates the project creation interface with project details (e.g., name and type), and adds the template roles to the project (e.g., GUI designer, database query coder, and core logic coder) (1508).

Regardless of whether a template is available or not, the logic 1500 accepts input defining the new project (1510). Examples of project definition input include, as examples, the project name, project type, project description, start date, end date, roles, and other elements. The project controller may choose to save the project as a new template (1512).

The logic 1500 identifies the targets for resource discovery requests (1514), e.g., via input on the resource site selection panel 606. In preparation for sending resource discovery requests, the logic 1500 identifies each role added to the project (1516). For each role and each target, the logic 1500 may execute the terminology translation engines to covert the project descriptors and the role descriptors to the terminology used at the specific target (1518). The logic 1500 then transmits the project and role using the converted terminology in a resource discovery request to the target (1520). In other implementations, the logic 1500 may translate the project and roles as a whole, and send a single discovery request including all of the roles to the target system.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions 222 read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system for resource discover for an enterprise comprising:
   a communication interface;
   resource discovery circuitry coupled to the communication interface and configured to:
   generate a project creation interface, wherein the project creation interface further comprises a project execution input;
   query a project template database to discover pre-defined project types, the project template database stored in a local data repository internal to the enterprise as a proprietary data source of the enterprise;

in the project creation interface, provide a selection interface for the pre-defined project types;
after selection of a specific pre-defined project type from the selection interface:
automatically populate the project creation interface with the specific pre-defined project type;
query the template database for project roles pre-defined for accomplishing the specific pre-defined project type; and
automatically populate the project creation interface with the project roles;
respond to a selection of the project execution input by:
identify each individual role specified in the project creation interface; and
for each individual role identified in the project creation interface:
generate a resource site selection interface;
receive, from the resource site selection interface, a resource discovery request for candidate resources, the resource discovery request comprising a resource site selection of discovery targets, a project role name of a respective individual role and role characteristics for the respective individual role, the role characteristics descriptive of a resource being sought via a respective discovery target to fill the respective individual role, the discovery targets being internal enterprise resource sites that are proprietary datasources internal to the enterprise, external resource sites that are external to the enterprise and publically available, or both; and
for each resource site selection of a discovery target that is an external resource site that is publically available, translate the resource discovery request from enterprise specific terminology in use in the enterprise to external resource site specific terminology in use in the external resource site identified by the resource site selection, and transmit the translated resource discovery request for candidate resources, including translated role characteristics for the respective individual role and translated project characteristics for the specific pre-defined project type to the external resource site identified by the resource site selection;
execute a model training process to train a resource translator and a project translator to translate terminology in place within the enterprise to a terminology applied by the external resource site identified by the resource site selection, wherein the model training process uses machine learning that includes natural language processing;
identify a resource candidate for potentially filling a particular role among the project roles;
query an enterprise-specific private profile database for private feedback detail for the resource candidate, the enterprise-specific private profile database stored in the local data repository internal to the enterprise as an internal resource site not shared with the external resource sites, the private feedback detail for the resource candidate including resource descriptors of a quality of service provided by the resource candidate, the resource descriptors comprising one or more of an error rate, an up-time, a timeliness or a responsiveness;
obtain public feedback detail for the resource candidate from the external resource sites, the external resource sites being external to the enterprise and publically available; and
generate a resource profile interface comprising:
a public evaluation interface panel populated with public feedback detail for the resource candidate; and
an enterprise-private interface panel populated with the private feedback detail for the resource candidate.

2. The system of claim 1, where the resource discovery circuitry is further configured to:
identify specified role characteristics of each individual role;
execute the resource translator on the specified role characteristics for the external resource site; and
obtain translated resource role characteristics for the external resource site from the resource translator; and
where the specified role characteristics comprise recognizable terminology of the enterprise, and the translated resource role characteristics comprise terminology recognizable by the external resource site, the recognizable terminology of the enterprise being different than the terminology recognizable by the external resource site.

3. The system of claim 2, where:
the specified role characteristics comprise a role name, role qualifications, experience level, review score, or any combination thereof.

4. The system of claim 1, where the resource discovery circuitry is further configured to:
identify specified project characteristics of the specific pre-defined project type;
execute the project translator on the specified project characteristics for the external resource site;
obtain translated project characteristics for the external resource site from the project translator; and
where the specified project characteristics comprise recognizable terminology of the enterprise, and the translated project characteristics comprise terminology recognizable by the external resource site, the recognizable terminology of the enterprise being different than the terminology recognizable by the external resource site.

5. The system of claim 4, where:
the specified project characteristics comprise a project name, project type, project technology or any combination thereof.

6. The system of claim 1, where:
the resource site selection interface comprises an enterprise-internal selector for selection of the discovery target as resource sites internal to the enterprise that privately curated by the enterprise, and an enterprise-external selector for selection of the discovery target as resource sites external to the enterprise that are publically available; and
where, for enterprise-internal selections made from the resource site selection interface, the resource discovery circuitry is configured to forgo project and resource translation prior to transmitting each individual role to enterprise-internal sites associated with the enterprise-internal selections.

7. The system of claim 6, where:
for enterprise-external selections made from the resource site selection interface, the resource discovery circuitry is configured to execute project and resource translation prior to transmitting each individual role to enterprise-external sites associated with the enterprise-external selections.

8. A method of resource discovery for an enterprise comprising:
   in an enterprise system comprising a communication interface and resource discovery circuitry, with the resource discovery circuitry:
      generating a project creation interface, wherein the project creation interface further comprises a project execution input;
      querying a project template database to discover pre-defined project types, the project template database stored in a local data repository internal to the enterprise as a proprietary data source of the enterprise;
      in the project creation interface, providing a selection interface for the pre-defined project types;
   after selection of a specific pre-defined project type from the selection interface:
      automatically populating the project creation interface with the specific pre-defined project type;
      querying the project template database for project roles pre-defined for accomplishing the specific pre-defined project type;
      automatically populating the project creation interface with the project roles;
   responding to a selection of the project execution input by:
      identifying each individual role specified in the project creation interface; and
      for each individual role identified in the project creation interface:
         generating a resource site selection interface;
         receiving, from the resource site selection interface, a resource discovery request for candidate resources, the resource discovery request comprising a resource site selection of discovery targets, a project role name of a respective individual role and role characteristics for the respective individual role, the role characteristics descriptive of a resource being sought via a respective discovery target to fill the respective individual role, the discovery targets being internal enterprise resource sites that are proprietary datasources internal to the enterprise, external resource sites that are external to the enterprise and publically available, or both; and
         for each resource site selection, of a discovery target that is an external resource site that is publically available:
            translating the resource discovery request from enterprise specific terminology in use in the enterprise to external resource site specific terminology in use in the external resource site identified by the resource site selection, and
   transmitting the translated resource discovery request for candidate resources, including translated role characteristics for the respective individual role and translated project characteristics for the specific pre-defined project type to the external resource site identified by the resource site selection;
      executing a model training process to train a resource translator and a project translator to translate terminology in place within the enterprise to a terminology applied by the external resource site identified by the resource site selection, wherein the model training process uses machine learning that includes natural language processing;
      identifying a resource candidate for potentially filling a particular role among the project roles;
      querying an enterprise-specific private profile database for private feedback detail for the resource candidate, the enterprise-specific private profile database stored in the local data repository internal to the enterprise as an internal resource site that is not shared with the external resource sites, the private feedback detail for the resource candidate including resource descriptors of a quality of service provided by the resource candidate, the resource descriptors comprising one or more of an error rate, an up-time, a timeliness or a responsiveness;
      obtaining public feedback detail for the resource candidate from external resource sites, the external resource sites being external to the enterprise and publically available;
      and
         generating a resource profile interface comprising:
            a public evaluation interface panel populated with public feedback detail for the resource candidate; and
            an enterprise-private interface panel populated with the private feedback detail for the resource candidate.

9. The method of claim 8, further comprising:
identifying specified role characteristics of each individual role;
executing the resource translator on the specified role characteristics for the external resource site; and
obtaining translated resource characteristics for the external resource site from the resource translator; and
where the role characteristics comprise recognizable terminology of the enterprise, and the translated resource characteristics comprise terminology recognizable by the external resource site, the recognizable terminology of the enterprise being different than the terminology recognizable by the external resource site.

10. The method of claim 9, where:
the specified role characteristics comprise a role name, role qualifications, experience level, review score, or any combination thereof.

11. The method of claim 8, further comprising:
identifying specified project characteristics of the specific pre-defined project type;
executing the project translator on the specified project characteristics for the external resource site; and
obtaining translated project characteristics for the external resource site from the project translator; and where the specified project characteristics comprise recognizable terminology of the enterprise, and the translated project characteristics comprise terminology recognizable by the external resource site, the recognizable terminology of the enterprise being different than the terminology recognizable by the external resource site.

12. The method of claim 11, where:
the specified project characteristics comprise a project name, project type, project technology or any combination thereof.

13. The method of claim 8, where:
the resource site selection interface comprises an enterprise-internal selector for selection of the discovery target as resource sites internal to the enterprise that privately curated by the enterprise, and an enterprise-external selector for selection of the discovery target as resource sites external to the enterprise that are publically available; and where, for enterprise-internal selections made from the resource site selection interface, further comprising: forgoing project and resource translation prior to transmitting each individual role to enterprise-internal sites associated with the enterprise-internal selections.

14. The method of claim 13, where:
for enterprise-external selections made from the resource site selection interface, further comprising: executing project and resource translation prior to transmitting each individual role to enterprise-external sites associated with the enterprise-external selections.

15. A resource discovery system for an enterprise, the system comprising:
a communication interface;
a project template database the project template database stored in a local data repository internal to the enterprise as a proprietary data source of the enterprise;
a translation rule database the translation rule database stored in the local data repository internal to the enterprise as a proprietary data source of the enterprise;
resource discovery circuitry configured to:
  generate a project creation interface, wherein the project creation interface further comprises a project execution input;
  query the project template database to discover pre-defined project types and pre-defined project roles for the pre-defined project types;
  in the project creation interface, provide a selection interface allowing selection among the pre-defined project types;
  after selection of a specific pre-defined project type from the selection interface:
    automatically populate the project creation interface with the specific pre-defined project type; and
    automatically populate the project creation interface with the project roles;
  in the project creation interface, provide a preview interface element;
  execute a model training process to train a resource translator and a project translator to translate terminology in place within the enterprise to a terminology applied by a target resource site, wherein the model training process uses machine learning that includes natural language processing;
  after selection of the preview interface element:
    determine the target resource site to which to issue a resource discovery request for the specific pre-defined project type, the resource discovery request being a request for candidate resources comprising a resource site selection of the target resource site, a project role name of a respective individual role and role characteristics for the respective individual role, the role characteristics descriptive of a candidate resource being sought via the target resource site to fill the respective individual role, the target resource site being an internal enterprise resource site that is a proprietary datasource internal to the enterprise or an external resource site that is external to the enterprise and publically available; identify specified role characteristics of the project role;
    determine whether the target resource site is internal to the enterprise or external to the enterprise; and
    when the target resource site is external to the enterprise:
      execute a resource translator on the specified role characteristics for the target resource site;
      obtain translated resource characteristics for the target resource site from the resource translator; and
      populate a preview interface with the translated resource characteristics;
  communicate the translated resource characteristics to the target resource site in the resource discovery request for candidate resources; and
an enterprise-specific private profile database comprising enterprise-internal resource analysis data, the enterprise-specific private profile database stored in the local data repository internal to the enterprise as an internal resource site not shared with any of the external resource sites; and
where the resource discovery circuitry is further configured to:
  identify a resource candidate for potentially filling a particular role among the project roles;
  query the enterprise-specific private profile database for enterprise-internal feedback detail for the resource candidate, the enterprise-internal feedback detail including resource descriptors of quality of service provided by the resource candidate, the resource descriptors comprising one or more of an error rate, uptime, timeliness, responsiveness;
  obtain enterprise-external feedback detail for the resource candidate from another external resource site, the another external resource site being external to the enterprise and publically available; and
  generate a resource profile interface comprising:
    a first evaluation interface panel populated with enterprise-internal feedback detail for the resource candidate; and
  a second interface panel populated with the enterprise-external feedback detail for the resource candidate.

* * * * *